United States Patent
Jansen et al.

(10) Patent No.: US 10,329,431 B2
(45) Date of Patent: *Jun. 25, 2019

(54) HEAT-CURABLE POWDER COATING COMPOSITION

(71) Applicant: DSM IP ASSETS B.V., Heerlen (NL)

(72) Inventors: Johan F.G.A. Jansen, Geleen (NL); Jan Pieter Drijfhout, Steenwijk (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/866,623

(22) Filed: Sep. 25, 2015

(65) Prior Publication Data

US 2016/0017153 A1    Jan. 21, 2016

Related U.S. Application Data

(63) Continuation of application No. 13/127,254, filed as application No. PCT/EP2009/064730 on Nov. 6, 2009, now abandoned.

(60) Provisional application No. 61/112,390, filed on Nov. 7, 2008, provisional application No. 61/112,384, filed on Nov. 7, 2008.

(30) Foreign Application Priority Data

| Dec. 19, 2008 | (EP) | 08172327 |
| Mar. 25, 2009 | (EP) | 09156130 |
| Mar. 25, 2009 | (EP) | 09156131 |
| Mar. 25, 2009 | (EP) | 09156142 |
| Mar. 25, 2009 | (EP) | 19156137 |
| Mar. 25, 2009 | (EP) | 19156139 |

(51) Int. Cl.
| C09D 5/03 | (2006.01) |
| C09D 167/06 | (2006.01) |
| C08J 7/04 | (2006.01) |
| C08K 5/00 | (2006.01) |
| C08K 5/10 | (2006.01) |

(52) U.S. Cl.
CPC ............... *C09D 5/03* (2013.01); *C08J 7/047* (2013.01); *C09D 5/033* (2013.01); *C09D 5/036* (2013.01); *C09D 167/06* (2013.01); *C08J 2467/06* (2013.01); *C08K 5/0025* (2013.01); *C08K 5/10* (2013.01)

(58) Field of Classification Search
None
See application file for complete search history.

(56) References Cited

U.S. PATENT DOCUMENTS

| 5,304,332 A | 4/1994 | Richart |
| 5,480,726 A | 1/1996 | Richart |
| 5,763,099 A * | 6/1998 | Misev .................. C08F 283/01 428/482 |
| 5,922,473 A | 7/1999 | Muthiah et al. |
| 6,005,007 A | 12/1999 | Farmer et al. |
| 6,005,017 A * | 12/1999 | Daly .................. C08F 290/12 522/107 |
| 6,017,593 A | 1/2000 | Daly et al. |
| 6,048,949 A | 4/2000 | Muthiah et al. |
| 6,235,228 B1 | 5/2001 | Nicholl et al. |
| 6,291,581 B1* | 9/2001 | Bayards .............. C09D 167/06 523/526 |
| 2003/0017565 A1 | 1/2003 | Echigo et al. |
| 2006/0003109 A1 | 1/2006 | Bischof et al. |
| 2008/0275203 A1 | 11/2008 | Jansen et al. |
| 2011/0262637 A1 | 10/2011 | Jansen et al. |

(Continued)

FOREIGN PATENT DOCUMENTS

| EP | 0 431 656 | 6/1991 |
| EP | 0 636 669 | 2/1995 |

(Continued)

OTHER PUBLICATIONS

DSM Resins (Product data Sheet for 3125, Unsaturated Polyester); Jul. 13, 2016.*

(Continued)

*Primary Examiner* — Robert C Boyle
(74) *Attorney, Agent, or Firm* — Nixon & Vanderhye P.C.

(57) ABSTRACT

The invention relates to a one component heat curable powder coating composition comprising a resin containing reactive unsaturations and wherein all said reactive unsaturations are carbon carbon double bonds connected directly to an electron withdrawing group, a thermal initiation system comprising a peroxide chosen from the group of compounds represented by formula (1)

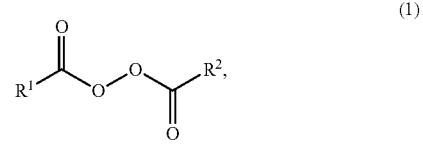

(1)

wherein $R^1$ and $R^2$ each independently stand for an optionally substituted alkyl of 1 to 30 C-atoms, wherein the 1 to 30 C-atoms do not include the C-atoms of the substituents or for an optionally substituted aryl of 6 to 18 C-atoms, wherein the 6 to 18 C-atoms do not include the C-atoms of the substituents, and a co-crosslinker chosen from the group of vinylethers, vinyletherurethanes, vinylesters, vinylamides, itaconates, enamines, vinylureas and mixtures thereof.

45 Claims, No Drawings

(56) References Cited

U.S. PATENT DOCUMENTS

| | | |
|---|---|---|
| 2011/0269908 A1 | 11/2011 | Jansen et al. |
| 2011/0274833 A1 | 11/2011 | Jansen et al. |

FOREIGN PATENT DOCUMENTS

| | | |
|---|---|---|
| EP | 0 844 286 | 5/1998 |
| EP | 0 636 669 B1 | 4/1999 |
| EP | 0 942 050 | 9/1999 |
| EP | 0 957 141 | 11/1999 |
| EP | 0 957 142 | 11/1999 |
| EP | 1 195 392 | 4/2002 |
| EP | 1 195 393 | 4/2002 |
| EP | 1 023 353 B1 | 2/2004 |
| EP | 1 398 357 | 3/2004 |
| EP | 1 424 142 | 6/2004 |
| EP | 1 477 534 | 11/2004 |
| JP | 47-026189 | 7/1972 |
| JP | 55-27324 | 2/1980 |
| WO | 97/27253 | 7/1997 |
| WO | 97/38034 | 10/1997 |
| WO | 99/14254 | 3/1999 |
| WO | 02/100957 | 12/2002 |
| WO | 2006/082080 | 8/2006 |
| WO | 2007/045609 | 4/2007 |
| WO | 2007/134736 | 11/2007 |
| WO | 2010/052290 | 5/2010 |
| WO | 2010/052291 | 5/2010 |
| WO | 2010/052293 | 5/2010 |
| WO | 2010/052294 | 5/2010 |
| WO | 2010/052295 | 5/2010 |
| WO | 2010/052296 | 5/2010 |

OTHER PUBLICATIONS

International Search Report for PCT/EP2009/064730, dated Mar. 15, 2010.

International Preliminary Report on Patentability for PCT/EP2009/064730, dated Jan. 13, 2011.

Database WPI, Thomson Scientific, JP 55-027324, Feb. 1980 (Abstract).

DSM Resins, Product Data Sheet, Unsaturate Polyester resin, Jul. 13, Version: 008758/10.1, 2016.

DSM, Product Data Sheet for 3125, Unsaturated, Polyester, Tg, 2016.

* cited by examiner

HEAT-CURABLE POWDER COATING COMPOSITION

This application is a continuation of commonly owned U.S. application Ser. No. 13/127,254, filed Jul. 18, 2011 (now abandoned), which is the national phase of International Application No. PCT/EP2009/064730 filed Nov. 6, 2009 which designated the U.S. and claims priority to U.S. Provisional Application Nos. 61/112,390 and 61/112,384 both filed on Nov. 7, 2008, EP Application Nos. 08172327.2 filed Dec. 19, 2008, Ser. No. 09/156,130.8, 09156139.9, 09156137.3, 09156142.3 and 09156131.6 all filed on Mar. 25, 2009, the entire contents of each of which are hereby incorporated by reference.

The invention relates to a heat-curable powder coating composition, a process for the preparation thereof, use of the powder coating composition to coat a substrate therewith, a substrate coated with the powder coating composition and a process for coating a substrate using the powder coating composition.

EP0844286A1 discloses a dual thermal and ultraviolet curable powder coating composition, which is a composition in solid particulate form that comprises a blend of:
a) film-forming resin;
b) a second resin co-polymerizable with said base resin;
c) a photoinitiator; and
d) a thermal initiator.

JP 55 027423 A discloses a composition comprising (a) 100 parts by weight. of unsaturated polyesters solid at room temperature; (b)<1 parts by weight in metal of Pb (compound) or Mn (compound); and (c)<5 parts by weight radical initiator.

EP0957141A1 discloses a low temperature mixture of powder (A) and a powder (B), in which at least the powder (A) includes an unsaturated polyester resin and a free radical initiator for initiating polymerization of unsaturated polyester resins in the powder coating compositions and the powder (B) includes a polymerization promoter.

As shown by the article "Overview of the powder coatings market worldwide" by G. Maggiore in Pitture e Vernice Europe 1/92, pp. 15-22 and by the lecture by D. Richart "Powder Coating: Current Developments, Future Trends" (Waterborne, High-Solids and Powder Coatings Symposium, Feb. 22-24, 1995), the search is still continuing for powder coating compositions which can be cured with little thermal stress of the substrate and which consequently are suitable for use on heat-sensitive substrates such as, for example, wood and plastic.

Besides the desire for a powder coating composition that can be cured at low temperature, it is also desired that such a powder coating composition can still be processed in an extruder.

Therefore, there is a need for a powder coating composition that balances the ability to be cured at a low temperature of for example 60 to 130° C. thereof with a good processability in an extruder.

Furthermore, there is a desire to have a one component powder coating composition as opposed to a two component powder coating composition as one component powder coating compositions may provide coatings having better properties, such as for example surface appearance, resistance to acetone, impact resistance etc.

With a 'one component system' as used herein, also called a 1K system, is meant that all (reactive) components of the powder coating composition form part of one powder. This as opposed to a two component system, also called 2K system, wherein the powder coating composition is composed of at least two different powders with different chemical compositions, which keeps the reactive components physically separated. The at least two different powders may be mixed in a physical blend before the powder coating composition is put in the storage container or may be mixed just before applying the 2K system to a substrate to let a curing reaction take place. The compositions of the at least two different powders in the 2K system are usually selected such that each powder contains an ingredient which is needed for curing but is absent from the other powder(s). This separation allows preparation of the individual powder composition in a heated state (such as by melt mixing) without the initiation of the cure reaction.

Furthermore, it is also important that these powder coating compositions are storage stable. With 'storage stable' is meant that a powder coating composition retains its curing characteristics, including flow, after storage, for example after storage at 20° C. for 2 months.

Flow characteristics (flow) of the powder coating compositions on the substrate can be determined by comparing the flow of the coating with PCI Powder Coating Flow panels (ACT Test Panels Inc.) at a coating thickness of approximately 60 μm. The rating of flow is from 1 to 10, with 1 representing the roughest coating and 10 representing the coating with the best flow.

In order to obtain a storage stable composition, the most obvious choice would be a two component powder coating composition. However, in order to obtain the best properties of the resulting coating, a one component powder coating composition may be desired.

Therefore, it is the object of the present invention to provide a one component heat curable powder coating composition which is easily processable in the extruder and which can be partially or fully thermally cured at low temperatures, for example between 60-130° C., making it suitable for use not only for non heat-sensitive substrates, but in particular also for heat-sensitive substrates and which heat curable powder coating composition is also storage stable.

This object is achieved by a one component heat curable powder coating composition comprising a resin containing reactive unsaturations and wherein all said reactive unsaturations are carbon carbon double bonds connected directly to an electron withdrawing group, a thermal initiation system comprising a peroxide chosen from the group of compounds represented by formula (1)

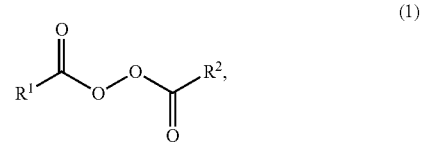

(1)

wherein $R^1$ and $R^2$ each independently stand for an optionally substituted alkyl of 1 to 30 C-atoms, wherein the 1 to 30 C-atoms do not include the C-atoms of the substituents or for an optionally substituted aryl of 6 to 18 C-atoms, wherein the 6 to 18 C-atoms do not include the C-atoms of the substituents and a co-crosslinker chosen from the group of vinylethers, vinylesters, vinylamides, itaconates, enamines and mixtures thereof.

With easily processable in the extruder is meant that the powder coating composition can be extruded to form an extrudate without forming gel particles, preferably without forming a gel.

With heat curable is meant within the framework of the current invention that curing of the powder coating composition can be effected by using heat.

A thermal initiation system is present in the composition of the present invention to make this heat curing possible. Heat curing has the advantage that in a one step process of heating a powder coating composition without the use of additional equipment, for instance equipment that generates UV light or accelerated electrons, the powder coating can be melted and cured onto a substrate, whereas with radiation curing of a powder coating composition on a substrate two steps are needed to melt and cure a powder coating on a substrate. In such a two step of radiation curing, first the powder coating composition is melted onto the substrate using heat, after which it is cured using UV or electron beam irradiation. Heat curing is especially desirable for coating 3D objects.

Preferably, the powder coating composition of the present invention is cured at a temperature of from 60 to 130° C. More preferably, the curing temperature is at least 65° C., even more preferably at least 70° C., for example at least 75° C., for example at least 80° C. More preferably, the curing temperature is at most 125° C., even more preferably at most 120° C., in particular at most 115° C., in particular at most 110° C., for example at most 105° C. or for example at most 100° C. In special cases, for example for substrates that are more heat-sensitive, it may be of advantage to cure the powder coating composition at an even lower temperature, for example at a temperature lower than 100° C., lower than 95° C., lower than 90° C. or even lower than 85° C.

For the purpose of the invention with one acetone double rub (ADR) is meant one back and forward movement over the surface of a coating having a thickness of approximately 60 μm using a cotton cloth drenched in acetone, which cotton cloth covers a hammer head having a weight of 980 gram and a contact surface area with the coating of 2 cm². Every 20 rubs the cloth is drenched in acetone. The measurement is continued until the coating is removed (and the obtained ADR number is noted down) or until 100 ADR are reached.

Preferably, a coating prepared from a powder coating composition of the present invention resists at least 60 ADR, for example at least 70 ADR, at least 80 ADR, at least 90 ADR or at least 100 ADR when the coating composition is applied to a substrate, for example an aluminum substrate (ALQ panel) and is cured at a temperature of 130° C., preferably for a time of at most 20 minutes, more preferably at most 15 minutes.

With 'powder coating composition' is meant a composition that can be applied to a substrate as a dry (without solvent or other carrier) finely divided solid, which when melted and fused, forms a continuous film that adheres to the substrate.

With the term 'thermal initiation system' as used herein is meant the system that triggers the radical polymerization.

The amount of peroxide is calculated herein based on the amount of resin and co-crosslinker (the resin system) in the powder coating composition. In other words, for calculating the amount of peroxide, the resin system is defined as the resin containing the reactive unsaturations plus the co-crosslinker, excluding the usual powder coating composition additives, like pigments, fillers etc.

The curing of the powder coating composition according to the invention can be effected by means of heat; that is the powder coating composition is heat curable. The peroxide in the thermal initiation system upon heating generates radicals able to initiate polymerization of the reactive unsaturations in the resin in combination with the unsaturated groups in the co-crosslinker or the polymerization of the reactive unsaturations in the resins. Solid initiators are preferred over liquid ones.

The peroxide in the powder coating composition of the present invention is a peroxide chosen from the group of compounds represented by formula (1)

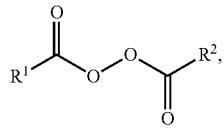

(1)

wherein $R^1$ and $R^2$ each independently stand for an optionally substituted alkyl of 1 to 30 C-atoms, wherein the 1 to 30 C-atoms do not include the C-atoms of the substituents or for an optionally substituted aryl of 6 to 18 C-atoms, wherein the 6 to 18 C-atoms do not include the C-atoms of the substituents. Preferably, the peroxide is a compound represented by formula 1, wherein $R^1$ and $R^2$ each independently stand for an alkyl of 1 to 20 C-atoms, more preferably for an alkyl of 6 to 20 C-atoms or an aryl of 6 to 12 C-atoms. More preferably, the peroxide is a compound represented by formula (1), wherein $R^1$ and/or $R^2$ stand for phenyl or for wherein $R^1$ and/or $R^2$ stand for an alkyl of 6 to 20 C-atoms. Most preferably, both $R^1$ and $R^2$ stand for phenyl (compound of formula (1) is benzoyl peroxide) or both $R^1$ and $R^2$ stand for dodecane (compound of formula (1) is lauroyl peroxide). Therefore, in a preferred embodiment, the peroxide is benzoyl peroxide or lauroyl peroxide (sometimes also called lauryl peroxide or dilauroyl peroxide).

The amount of peroxide is preferably chosen such that when the powder coating composition is applied to a substrate and cured at a temperature of 130° C. for 20 minutes, the resulting coating resists at least 50 acetone double rubs.

It is clear to the person skilled in the art that also mixtures of peroxide compounds of formula (1) may be employed in the powder coating composition of the invention.

The resin contains reactive unsaturations in which all said reactive unsaturations are carbon carbon double bonds connected directly to an electron withdrawing group. With reactive unsaturations is meant that the carbon carbon double bonds connected directly to an electron withdrawing group are reactive towards radicals generated by the peroxide. For the avoidance of doubt, reactive unsaturations do not include aromatic rings.

Examples of suitable resins include polyesters, polyacrylates (=acrylic resins), polyurethanes, epoxy resins, polyamides, polyesteramides, polycarbonates, polyureas etc., as well as mixtures thereof. Preferably the resin is a polyester.

The reactive unsaturations (the carbon carbon double bonds connected directly to an electron withdrawing group) may be present in the backbone of the resin, pendant on the (backbone of the) resin, at the terminus of the resin or at a combination of these locations.

Preferably resins having reactive unsaturations based on fumaric acid, maleic acid itaconic acid, acrylic acid and/or methacrylic acid, more preferably resins having reactive unsaturations based on fumaric acid and/or maleic acid are used in the powder coating composition of the present invention. Examples of how to introduce the reactive unsaturation in the resin are described below.

Polyesters are generally polycondensation products of polyalcohols and polycarboxylic acids.

Examples of polycarboxylic acids which may be used in the preparation of a polyester include isophthalic acid, terephthalic acid, hexahydroterephthalic acid, 2,6-naphthalenedicarboxylic acid and 4,4'-oxybisbenzoic acid, 3,6-dichlorophthalic acid, tetrachlorophthalic acid, tetrahydrophthalic acid, hexahydroterephthalic acid, hexachloroendomethylenetetrahydrophthalic acid, endomethylenetetrahydrophthalic acid, phthalic acid, azelaic acid, sebacic acid, decanedicarboxylic acid, adipic acid, succinic acid and trimellitic acid. These illustrative acids can be used in their acid form or where available, in the form of their anhydrides, acyl chlorides or lower alkyl esters. Mixtures of acids can also be used. In addition hydroxycarboxylic acids and lactones can be used. Examples include hydroxypivalic acid and ε-caprolactone.

Polyalcohols, in particular diols, can be reacted with the carboxylic acids or their analogues as described above to prepare the polyester. Examples of polyalcohols include aliphatic diols, for example, ethylene glycol, propane-1,2-diol, propane-1,3-diol, butane-1,2-diol, butane-1,4-diol, butane-1,3-diol, 2,2-dimethylpropane-1,3-diol (neopentyl glycol), hexane-2,5-diol, hexane-1,6-diol, 2,2-bis-(4-hydroxycyclohexyl)-propane (hydrogenated bisphenol-A), 1,4-dimethylolcyclohexane, diethylene glycol, dipropylene glycol and 2,2-bis[4-(2-hydroxyethoxy)-phenyl]propane, the hydroxypivalic ester of neopentylglycol and 4,8-bis-(hydroxymethyl)tricyclo[5,2,1,0]decane (=tricyclodecane dimethylol) and 2,3-butenediol.

Trifunctional or more functional alcohols (together: polyols) or acids can be used to obtain branched polyesters. Examples of suitable polyols and polyacids are glycerol, hexanetriol, trimethylolethane, trimethylolpropane, pentaerythritol and trimellitic acid.

Monofunctional acids, for example para-tert-butyl benzoic acid, benzoic acid, metha-toluic acid, cinnamic acid, crotonic acid may be used to block the polymer chain.

Preferably, the resin in the powder coating composition of the present invention is a polyester prepared from at least the following monomers: terephthalic acid, neopentylglycol and/or propylene glycol. For branching trimethylolpropane may be present in the polyester.

The polyesters can be prepared via customary, generally known polymerization methods by esterification and/or transesterification or by esterification and/or transesterification via the use of an enzyme. For example, if needed, customary esterification catalysts such as, for example, butylchlorotindihydroxide, dibutyltin oxide, tetrabutyl titanate or butyl stannoic acid can be used. Examples of amounts of these esterification catalysts used are usually around 0.1 wt % based on the total weight of the polyester.

The conditions of preparation of the polyester and the COOH/OH ratio can be chosen such that end products are obtained which have an acid value or hydroxyl value which is within the intended range of values.

Preferably, the viscosity of the polyester resin is in the range of from 2 to 30 Pa·s as measured at 160° C. using the method as described herein.

The resin can also be a polyacrylate, also known as acrylic resin. Generally, an acrylic resin is based on alkyl esters of (meth)acrylic acid optionally in combination with styrene. These alkyl esters of (meth)acrylic acid may be replaced by hydroxyl or glycidyl functional (meth)acrylic acids. Examples of alkyl esters of (meth)acrylic acid include, for example ethyl (meth)acrylate, isopropyl (meth)acrylate, n-butyl (meth)acrylate, n-propyl (meth)acrylate, isobutyl (meth)acrylate, ethylhexyl acrylate, cyclohexyl (meth)acrylate and mixtures thereof.

To obtain an acrylic resin having a hydroxyl functionality, the acrylic resin contains a hydroxyl functional (meth)acrylic acid, preferably in combination with alkyl esters of (meth)acrylic acid. Examples of hydroxyl functional (meth)acrylic acid esters include hydroxyethyl (meth)acrylate, and hydroxypropyl (meth)acrylate etc.

To obtain an acrylic resin having a glycidyl functionality, the acrylic resin contains a glycidyl functional (meth)acrylic acid esters, preferably in combination with alkyl esters of (meth)acrylic acid. Examples of glycidyl functional (meth)acrylic acid esters include glycidyl methacrylate, etc.

Clearly, it is also possible to synthesize acrylic resins with both hydroxyl and glycidyl functionality.

Polyurethanes can for example be prepared using customary, generally known polyaddition reaction of a (poly)isocyanate with a (poly)alcohol in the presence of, if needed a catalyst and other additives.

For example, if needed, customary catalysts such as, for example tertiary amines or organometallic compounds, such as for example monobutyltin tris(2-ethylhexanoate), tetrabutyl titanate or dibutyl tin dilaurate can be used. Examples of amounts of these catalysts used are usually around 0.01 wt % based on the total weight of the resin.

Examples of the (poly)alcohols that may be used in the preparation of polyurethanes are the same as those that can be used in the preparation of a polyester.

Examples of isocyanates that may be used in the preparation of polyurethanes include but are not limited to diisocyanates, for example toluene 2,4-diisocyanate, toluene 2,6-diisocyanate, 4,4'-diphenyl methane diisocyanate, 2,4'-diphenyl methane diisocyanate, 2,2'-diphenyl methane diisocyanate, hexamethylene diisocyanate, 5-isocyabato-1-(isocyanatomethy)-1,3,3-trimethylcyclohexane (isophorone diisocyanate), m-tetramethylxylene diisocyanate, dicyclohexylmethane 4,4'-diisocyanate, naphthalene 1,5-diisocyanate or 1,4-diisocyanatobenzene; and triisocyanates, for example triphenylmethane-4,4',4"-triisocyanate.

The resin may also be a polyepoxide, also known as epoxy resin. Epoxy resins may for example be prepared from phenolic compounds in combination with epichlorohydrins resulting in epoxy resins like for example a bisphenol A diglycidyl ether such as is commercially available as Epicote™1001 or a Novolac epoxide.

Polyamides can for example be prepared by a polycondensation reaction of a diamine and a dicarboxylic acid.

The dicarboxylic acids may be branched, non-linear or linear. Examples of suitable dicarboxylic acids are for example phthalic acid, isophthalic acid, terephthalic acid, 1,4-cyclohexanedicarboxylic acid, naphthalene-2,6-dicarboxylic acid, cyclohexanediacetic acid, diphenyl-4,4'-dicarboxylic acid, phenylenedi (oxyacetic acid), sebacic acid, succinic acid, adipic acid, glutaric acid and/or azelaic acid.

Examples of suitable aliphatic diamines include for example isophorondiamine, 1,2-ethylenediamine, 1,3-propylenediamine, 1,6-hexamethylenediamine, 1,12-dodecylenediamine, 1,4 cyclohexanebismethylamine, piperazine, p-xylylenediamine and/or m-xylylenediamine. The polyamide may also be branched using branching components. Suitable examples of branching components include amines, for example di-alkylene-triamines, such as for example di-ethylene-triamine or di-hexamethylene-triamine; di-alkylene-tetramines or di-alkylene-pentamines; acids, for example 1,3,5-benzene tricarboxylic acid, trimellitic anhydride or pyromelitic anhydride; and poly-functional amino acids, such as for example aspartic acid or glutamic acid.

Polyester amides are resins containing both ester bonds (as in a polyester) and amide bonds (as in a polyamide) and may for example be prepared from mono-, di-, tri- or polyfunctional monomers, such as monomers with carboxylic acid functionality, monomers with hydroxyl functionality, monomers with amine functionality and/or monomers having a combination of any of these functionalities.

In principle any solid hydroxyl functional polycarbonate may be used. Hydroxyfunctional polycarbonates are commercially available from various sources.

Polyureas can for example be prepared using customary, generally known polyaddition reactions of a (poly)isocyanate with a (poly)amine in the presence of, if needed a catalyst and other additives similar to what is described above for polyurethanes. Suitable (poly)amines for the preparation of polyureas include those as are exemplified above for the polyamides. Suitable (poly)isocyanates for the preparation of polyureas include those as are exemplified above for the polyurethanes.

The reactive unsaturation may be built into the resin backbone, for instance by reacting a hydroxyl functional monomer (such as the polyalcohols mentioned before) with an unsaturated carboxylic acid or anhydride, such as for example fumaric acid, maleic acid, citraconic acid, itaconic acid or mesaconic acid.

Resins where it is possible to build reactive unsaturation into the backbone by reacting a hydroxyl functional monomer with an unsaturated carboxylic acid are for example polyesters.

Also, the reactive unsaturation may be connected to a side-group on the resin, by reacting an epoxide functional pendant group in the resin, for example a glycidyl functional acrylate, with an unsaturated carboxylic acid, such as for example methacrylic acid or acrylic acid or the monoesters of fumaric acid, maleic acid, citraconic acid, itaconic acid or mesaconic acid.

Also, the reactive unsaturation may be connected to a side-group on the resin, by reacting a hydroxyl functional pendant group in the resin, for example a hydroxyl functional acrylate, with an unsaturated carboxylic acid, such as for example methacrylic acid or acrylic acid or an unsaturated carboxylic anhydride, such as for example the anhydrides of itaconic acid, maleic acid or citraconic acid.

It is also possible to connect the reactive unsaturation to the terminus (or termini) of the resin, for example by reacting a hydroxyl functional, epoxide functional or amine functional terminal group with an unsaturated carboxylic acid, such as for example fumaric acid, maleic acid, citraconic acid, itaconic acid, mesaconic acid or the monoesters thereof, methacrylic acid or acrylic acid. So, a resin having a hydroxyl, amine or glycidyl terminal group may be reacted with such carboxylic acids.

Also, or alternatively, hydroxyl or amine functional resins may be modified with hydroxyl functional compounds containing a reactive unsaturation via reaction with a diisocyanate forming urethane and/or urea bonds. This modification may be done both on pendant hydroxyl groups and on terminal hydroxyl groups.

Sometimes also a small amount of inhibitor is present during the esterification to prevent loss of unsaturations due to the possible presence of peroxides in glycols and instability due to the esterification temperatures.

The weight per unsaturation (WPU) of the resin as determined using $^1$H NMR is usually less than 7500, preferably less than 1500, for example less than 1150 or less than 1100 or less than 1000 g/mole and/or preferably more than 100, more preferably more than 250 g/mole, for example more than 500 g/mole.

The WPU can for example be determined using $^1$H-NMR, for example as described in Journal of Applied Polymer Science,
Vol. 23, 1979, pp 25-38, the complete disclosure of which is hereby incorporated by reference, or by the method as described herein in the experimental section. In the method of the experimental section, the weight per unsaturation (WPU) was determined via $^1$H-NMR on a 300 MHz Varian NMR-spectrometer using pyrazine as internal standard, or the WPU was determined theoretically by dividing the Mn by the amount of unsaturations as added during the synthesis of the resin and/or the co-crosslinker.

In case of an amorphous resin, the glass transition temperature (Tg) of the resin is preferably at least 20° C., more preferably at least 25° C. Preferably, the resin is a polyester having a Tg of at least 40, preferably at least 45° C. and/or a Tg of at most 65° C., preferably at most 60° C., for example at most 55° C. or at most 50° C.

The amount of acid groups in a resin is determined by the titration of the acid/anhydride groups by KOH. The amount of acid groups is expressed as the acid value (AV) in mg KOH/g resin.

The amount of hydroxyl groups in a resin is determined by the titration of the hydroxyl groups with acetic anhydride and the back titration with KOH. The amount of hydroxyl groups is expressed as the hydroxyl value (OH-value or OHV) in mg KOH used per g resin.

A resin is classified as acid functional in case the hydroxyl value is lower than the acid value. In case a carboxylic functional resin is desired, the hydroxyl value of the resin is usually below 10 mg KOH per g resin.

A resin is classified as hydroxyfunctional in case the acid value is lower than the hydroxyl value. In case a hydroxyl functional resin is desired, the acid value of the resin is usually below 10 mg KOH per g resin.

The hydroxyl value of the resin in the powder coating composition of the present invention is usually in the range of from 0 to 70 mg KOH per g resin.

It is desired to have a resin, preferably a polyester, with an acid value of less than 10, preferably less than 5 mg KOH per g resin in case a vinylether or vinylester co-crosslinker is used in the powder coating composition of the present invention. In case a co-crosslinker other than a vinylether or a vinylester is used, the acid value of the resin, preferably a polyester may range from 0 to 250, for example from 0 to 60 mg KOH per g of the resin.

The number average molecular weight (Mn) of the resin is in principle not critical and can for example be from 1,000 to 20,000 Da. Preferably, the Mn of the resin is at least 1,500 Da, for example at least 2,000 Da and/or preferably at most 8,000, for example at most 4,000 Da in case of an amorphous resin and/or preferably at most 15,000 Da in case of a crystalline resin. Preferably, the resin is a polyester having a number average molecular weight (Mn) in the range of from 1,500 to 8,000, for example in the range of from 2,100 and 4,000 Da.

In the powder coating composition also a co-crosslinker is present. With co-crosslinker is meant a compound having carbon carbon double bonds which are reactable with the reactive unsaturations (the carbon carbon double bonds directly connected to an electron withdrawing group) in the resin.

The co-crosslinker for use in the composition of the present invention, is chosen from the group of vinylethers, vinylesters, vinylamides, itaconates, enamines, and mixtures thereof, preferably from the group of vinylethers, vinylesters and mixtures thereof.

A vinylether is a monomer, oligomer or polymer having a vinylether moiety (see formula (2) in Table 1). The co-crosslinker in the powder coating composition of the present invention is for example a vinylether. Examples of liquid vinylethers include mono (alcohol) functionalized vinylethers, for example ethyl vinylether, 4-hydroxybutyl vinylether, 2-hydroxyethyl vinylether, diethylene glycol monovinyl ether or 4-(hydroxy methyl) cyclohexyl methyl vinyl ether (1,4-cyclohexanedimethanol vinyl ether); di alcohol functionalized vinylethers, such as for example butanediol divinylether, diethyleneglycol divinylether, triethyleneglycol divinylether, tetraethyleneglycol divinylether, poly-THF™ 290-divinylether, hexanediol divinylether, 1,4-cyclohexanedimethanol divinylether; tri alcohol functionalized vinylethers, for example trimethylol propane trivinylether, 1,2,4-trivinylcyclohexane; and mono amino functional vinylethers, for example 3-amino propyl vinyl ether.

For example, a vinylether may be prepared from a dimethylester and a hydroxyfunctional vinylether under formation of a vinyletherester.

Examples of amorphous or semi-crystalline vinyl ethers include vinylether urethanes, vinylether polyester urethanes, vinylether ureas and vinylether polyester ureas. The polyester part of a vinylether polyester urethane is generally a polycondensation product of polyalcohols and polycarboxylic acids and may have the same monomers and may be synthesized analogous to the synthesis of polyesters as described above. The polyester part of vinylether polyester urethane may be saturated or unsaturated and may be similar to the resin.

In order to prepare a vinylether urethane, isocyanate may be reacted with a hydroxyfunctional vinylether and/or a polyalcohol. To prepare a vinylether polyester urethane, an isocyanate may be reacted with a hydroxyfunctional vinylether and a hydroxyfunctional polyester (for example a polyester as described above). These reactions are customary, generally known polyaddition reaction of a (poly) isocyanate with a (poly)alcohol in the presence of, if needed, a catalyst and other additives. Some examples of catalysts, other additives, polyalcohols and isocyanates are given herein (see for example the part on polyurethanes).

Examples of vinylethers also include vinyletherpolyesters, which for example can be prepared from acid functional polyesters (for example as exemplified herein) with hydroxyfunctional vinylethers (for example as exemplified herein). Of course, it is also possible to prepare vinyletherpolyesters via transesterification of hydroxyfunctional or alkylfunctional polyesters with hydroxyfunctional vinylethers.

A vinylester is a monomer, oligomer or polymer having a vinylester moiety (see formula (3) in Table 1). Examples of vinylesters include mono functional vinylesters, for example stearic acid vinylester, palmitic acid vinylester, benzoic acid vinylester, lauric acid vinylester, hexanoic acid vinylester, pivalic acid vinylester, oleic acid vinylester, methacrylic acid vinylester, decanoic acid vinylester, bromo acetic acid vinylester, myristic acid vinylester, valeric acid vinylester, nonanoic acid vinylester, heptanoic acid vinylester, phenyl acetic acid vinylester, maleic acid (di)vinylester, undecanoic acid vinylester, iodo acetic acid vinylester, 2-naphthoic acid vinylester, 3-chloro-butyric acid vinylester, 4-chloro-butyric acid vinylester and 2-chloro-butyric acid vinylester; di functional vinylesters, such as for example adipic acid divinylester, fumaric acid divinylester, sebacic acid divinylester, phthalic acid divinylester and terephthalic acid divinylester; and polyfunctional vinylesters, for example trimellitic acid trivinylester.

A vinylamide is a monomer, oligomer or polymer having a vinylamide moiety (see formula (4) in Table 1).

An itaconate is a monomer, oligomer or polymer having an itaconate moiety (see formula (5) in Table 1). Examples of liquid itaconates include diethylitaconate, dibutylitaconate, etc. Examples of solid itaconates include dimethylitaconate. Examples of amorphous itaconates are as given above (see for example the part on a resin modified with monoesters of itaconic acid or itaconic acid). Since resins containing unsaturations based on itaconic acid can homopolymerize, a resin containing itaconic acid based unsaturations may be used in combination with an oligomer or polymer containing itaconic acid based unsaturations as a co-crosslinker.

An enamine is a monomer, oligomer or polymer having an enamine moiety (see formula (6) in Table 1).

As defined herein, a monomer has an Mn below 500 Da, an oligomer has an Mn below 1,500 Da and a polymer has an Mn of at least 1,500 Da.

TABLE 1

The co-crosslinker for use in the composition of the present invention, is chosen from the group of monomers, oligomers or polymers comprising one or more of the following moieties: vinylester, vinylether, vinyl amide, itaconate and/or enamine moieties. The points of attachment of the moieties are indicated with

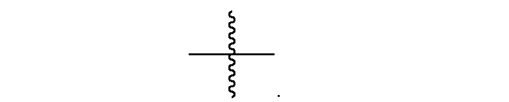

| Structural formula | name |
|---|---|
|  | vinylether |
| (2) |  |
|  | vinylester |
| (3) |  |
|  | vinyl amide |
| (4) |  |
|  | itaconate |
| (5) |  |

TABLE 1-continued

The co-crosslinker for use in the composition of the present invention, is chosen from the group of monomers, oligomers or polymers comprising one or more of the following moieties: vinylester, vinylether, vinyl amide, itaconate and/or enamine moieties. The points of attachment of the moieties are indicated with

| Structural formula | name |
|---|---|
| (6) | enamine |

In case the carbon carbon double bonds directly connected to an electron withdrawing group in the resin are capable of reacting with the resin itself (i.e. the resin is homopolymerizable) as may be the case for some resins containing itaconate moieties, the resin and the co-crosslinker may contain the same moieties, and in a special embodiment, the presence of a separate co-crosslinker is therefore optional and the resin and the co-crosslinker may be the same.

In case the resin is incapable of homopolymerization, a separate co-crosslinker needs to be present to obtain curing. For the avoidance of doubt, within the framework of the invention, a resin can homopolymerize if the reactive unsaturations in the resins are able to react with each other after radical initiation by the radical initiator.

The separate co-crosslinker may be (semi-)crystalline or amorphous. Also, a liquid co-crosslinker may be used. Preferably, the co-crosslinker is non-volatile at the temperatures and pressures used when processing, applying and storing the powder coating composition.

The weight per unsaturation of the co-crosslinker as determined using $^1$H NMR and is preferably lower than 870, for example lower than 650 g/mole, for example lower than 630 g/mole and/or preferably higher than 70, more preferably higher than 100, for example higher than 150 g/mole. The Mn of the co-crosslinker is not critical and may vary between wide ranges, for example the Mn may be between 100 and 20,000 Da.

The amount of co-crosslinker used in the powder coating composition is in principle not critical, especially if a homopolymerizable resin is used. In case the resin is not capable of homopolymerization, for example, the molar ratio of the unsaturations in the co-crosslinker and the unsaturations in the resin may be between 9:1 and 1:9, preferably between 2:1 and 1:2. For example, about equimolar amounts of unsaturations in the co-crosslinker and resin may be used.

In order to further enhance the storage stability of the powder coating composition of the present invention, one or more inhibitors may be added to the initiation system or may be added to the resin, for example during the resin synthesis. Therefore, the invention also relates to a powder coating composition according to the present invention further comprising an inhibitor.

Examples of inhibitors include phenolic compounds, stable radicals, catechols, phenothiazines, hydroquinones, benzoquinones or mixtures thereof. Preferably, stable radicals, catechols, phenothiazines, hydroquinones, benzoquinones or mixtures thereof are present in the powder coating of the invention.

Examples of phenolic compounds include 2-methoxyphenol, 4-methoxyphenol, 2,6-di-t-butyl-4-methylphenol, 2,6-di-t-butylphenol, 2,6-di-6-butyl-4-ethyl phenol, 2,4,6-trimethyl-phenol, 2,4,6-tris-dimethylaminomethyl phenol, 4,4'-thio-bis(3-methyl-6-t-butylphenol), 4,4'-isopropylidene diphenol, 2,4-di-t-butylphenol and 6,6'-di-t-butyl-2,2'-methylene di-p-cresol.

Examples of stable radicals include 1-oxyl-2,2,6,6-tetramethylpiperidine, 1-oxyl-2,2,6,6-tetramethylpiperidine-4-ol (a compound also referred to as TEMPOL), 1-oxyl-2,2,6,6-tetramethylpiperidine-4-one (a compound also referred to as TEMPON), 1-oxyl-2,2,6,6-tetramethyl-4-carboxyl-piperidine (a compound also referred to as 4-carboxy-TEMPO), 1-oxyl-2,2,5,5-tetramethylpyrrolidine, 1-oxyl-2,2,5,5-tetramethyl-3-carboxylpyrrolidine (also called 3-carboxy-PROXYL and galvinoxyl (2,6-di-tert-butyl-α-(3,5-di-tert-butyl-4-oxo-2,5-cyclohexadien-1-ylidene)-p-tolyloxy).

Examples of catechols include catechol, 4-t-butylcatechol, and 3,5-di-t-butylcatechol.

Examples of hydroquinones include hydroquinone, 2-methylhydroquinone, 2-t-butylhydroquinone, 2,5-di-t-butylhydroquinone, 2,6-di-t-butylhydroquinone, 2,6-dimethylhydroquinone and 2,3,5-trimethylhydroquinone.

Examples of benzoquinones include benzoquinone, 2,3,5,6-tetrachloro-1,4-benzoquinone, methylbenzoquinone, 2,6-dimethylbenzoquinone, and napthoquinone.

Other suitable inhibitors may for example be chosen from the group of an aluminium-N-nitrosophenyl hydroxylamine, a diethylhydroxylamine and a phenothiazine.

It is also possible to use a mixture of (the above mentioned) inhibitors. Preferably, the inhibitor is a hydroquinone, preferably a substituted hydroquinone, more preferably a 2-alkyl substituted hydroquinone; or a catechol, more preferably the inhibitor is a hydroquinone.

The preparation of powder coating compositions is described by Misev in "Powder Coatings, Chemistry and Technology" (pp. 224-300; 1991, John Wiley) hereby incorporated by reference.

A common way to prepare a powder coating composition is to mix the separately weighed-out components in a premixer, heat the obtained premix, for example in a kneader, preferably in an extruder to obtain an extrudate, cool down the obtained extrudate until it solidifies and crush it into granules or flakes that are further grinded to reduce the particle size followed by appropriate classification to obtain a powder coating composition of the right particle size. Therefore, the invention also relates to a process for the preparation of a powder coating composition according to the invention comprising the steps of:
  a. mixing the components of the powder coating composition to obtain a premix
  b. heating the obtained premix, preferably in an extruder, to obtain an extrudate
  c. cooling down the obtained extrudate to obtain a solidified extrudate and
  d. breaking the obtained solidified extrudate into smaller particles to obtain the powder coating composition.

Preferably, the premix is heated to a temperature at least 5° C., more preferably at least 10° C. below the temperature at which it is intended to cure the powder coating composition. If the premix is heated in an extruder, it is preferred to use a temperature control in order to avoid too high temperatures that could lead to curing of the powder coating composition in the extruder.

In another aspect, the invention relates to a process for coating a substrate comprising the following steps:
1) applying a powder coating composition according to the invention to a substrate (such that the substrate is partially or fully coated with a coating).
2) heating the (obtained partially or fully coated) substrate (for such time and to such temperature such that the coating is at least partially cured).

The powder coating composition of the present invention may be applied using the techniques known to the person skilled in the art, for example using electrostatic spray or electrostatic fluidized bed.

Heating of the coated substrate may be done using conventional methods, such as with a convection oven and/or with an (N)IR lamp. Even microwave equipment may be used to heat the substrate.

The time during which the coating is at least partially cured is preferably below 60 minutes and usually above 1 minute in case a convection oven is used to heat the coating. More preferably, the curing time is below 40 minutes in case a convection oven is used to heat the coating.

The temperature at which the coating is cured is preferably below 130° C. and usually above 60° C. Preferably, the curing temperature is lower than 120° C., more preferably lower than 110° C., most preferably lower than 100° C., most preferably lower than 95° C. Preferably, the curing temperature is at least 65° C., more preferably 70° C., even more preferably at least 75° C.

The powder coating composition of the present invention may optionally contain the usual additives, such as for example fillers/pigments, degassing agents, flow agents, or (light) stabilizers. Examples of flow agents include Byk™ 361 N. Examples of suitable fillers/pigments include metal oxides, silicates, carbonates or sulphates. Examples of suitable stabilizers include UV stabilizers, such as for example phosphonites, thioethers or HALS (hindered amine light stabilizers). Examples of degassing agents include benzoin and cyclohexane dimethanol bisbenzoate. Other additives, such as additives for improving tribo-chargeability may also be added.

In another aspect, the invention relates to a substrate that is fully or partially coated with a powder coating based on the heat-curable powder coating composition according to the present invention.

In one embodiment of the invention the substrate is a non heat-sensitive substrate, for example glass, ceramic, fibre cement board, or metal, for example aluminum, copper or steel. In another embodiment of the invention, the substrate is a heat-sensitive substrate. Therefore, the invention also relates to use of a powder coating composition of the invention to coat a heat-sensitive substrate, preferably wood.

Heat-sensitive substrates include plastic substrates, wood substrates, for example solid wood, such as for example: hard wood, soft wood, plywood; veneer, particle board, low density fibre board, medium density fibreboard and high density fibreboard, OSB (Oriented Strand Board) wood laminates, chipboard and other substrate in which wood is a important constituent, such as for example foil covered wooden substrates, engineered wood, plastic modified wood, plastic substrates or wood plastic compounds (WPC); substrates with cellulosic fibres, for example cardboard or paper substrates; textile and leather substrates.

Other heat-sensitive substrates include objects that are a combination of a metal substrate with a heat-sensitive part, such as plastic hosing, heavy metal parts, strips, for example aluminium frames with heat strips etc.

Examples of plastic substrates include unsaturated polyester based compositions, ABS (acrylonitril butadiene styrene), melamine-formaldehyde resins, polycarbonate, polyethylene, polypropylene, ethylene-propylene-diene monomer (EPDM), thermoplastic olefin (TPO), polyurethane (PU), polypropylene oxide (PPO), polyethylene oxide (PEO), polyethyleneterephthalate and nylon, for example polyamide 6,6 and combinations thereof, for example polycarbonate-ABS.

Other substrates that are particularly suitable for coating with the powder coating of the invention are those where a low temperature cure is desired for efficient production, such as heavy metal parts.

In another aspect, the invention relates to the use of a composition according to the invention to fully or partially coat a substrate.

Also, the invention relates to the use of a powder coating composition according to the invention as a stain, primer or topcoat layer.

Specific wood coating markets where the powder coating composition of the invention may be used include domestic furniture, such as tables, chairs, cabinets, etc., bedroom and bathroom furniture, office furniture, contract furniture such as school and child furniture, hospital furniture, restaurant and hotel furniture, kitchen cabinets and furniture, (flat) panels for interior design, interior and exterior windows and doors, interior and exterior window frames and door frames, exterior and interior sidings and wooden flooring.

Specific plastic coating markets where the powder coating composition of the invention may be used include automotive applications, such as interior car parts, wheel covers, bumpers, under the hood parts etc, flexible flooring, sporting goods, cosmetics, audio-visual applications, such as TV sets, computer housing, phones, etc., household appliances and satellite dishes.

In a special embodiment, the invention relates to the use of a powder coating composition of the invention to coat a heat-sensitive substrate, preferably wood.

EXAMPLES

The invention is explained in more detail with reference to the following non-limiting examples.

Experimental Section

Synthesis and Application of the Powder Coating

TABLE 2

| Chemicals | | |
|---|---|---|
| Chemical name | Commercial name | Description or use |
| Neopentyl glycol | | Monomer |
| Trimethylol propane | | Monomer |
| Hydrogenated bis-phenol A | | Monomer |
| Terephthalic acid | | Monomer |
| Isophthalic acid | | Monomer |
| Fumaric acid | | Monomer |
| Hydroxylbutyl vinylether | | Monomer |
| Isophoronediisocyanate | | Monomer |
| Ethylene carbonate | | Monomer |

TABLE 2-continued

Chemicals

| Chemical name | Commercial name | Description or use |
|---|---|---|
| Dilauroyl peroxide | Laurox ™ S from Akzo Nobel | Initiator |
| Dibenzoyl peroxide (BPO) | Luperox ™ A75 from Arkema | Initiator |
| Tert-butyl peroxybenzoate | Trigonox ™ C from Akzo Nobel | Initiator |
| Tert-butyl hydroquinone | | Inhibitor |
| Cobalt bis(2-ethylhexanoate), also known as Cobalt octanoate | COMMET ™ Cobalt Octanoate from De Monchy International B.V. | Accelerator |
| | Byk ™-361 N from Byk | Flow agent |

Synthesis of Resins: General Procedure

The chemicals used in the following examples are described in table 2.

Resin Synthesis (Resin A)

A reaction vessel fitted with a thermometer, a stirrer and a distillation device, was filled with a tin catalyst and the monomers for the first step (all the (poly)alcohols and terephthalic acid) as listed in table 3. Stirring was then applied and a light nitrogen flow was passed over the reaction mixture while the temperature was raised to 220° C. Subsequently, for the second step fumaric acid together with a small amount of radical inhibitor was added at a temperature of 180° C. followed by esterification at 220° C. When an acid value of less than approximately 15 mg KOH/g resin was reached, the reaction mixture was cooled to 205° C. The third stage of the polyester preparation was carried out under reduced pressure at 205° C. till an acid value of approximately 5 mg KOH/g resin was reached. The acid value of the resin was lowered further via reaction of the remaining acid-groups of the resin with ethylene carbonate. The used amount was dependent on the acid value before addition.

Resin and Co-Crosslinker Analysis:

Glass transition temperature (Tg) measurements (inflection point) and melting temperature measurements were carried out via differential scanning calorimetry (DSC) on a Mettler Toledo, TA DSC821, in $N_2$ atmosphere and at a heating rate of 5° C./min. Viscosity measurements were carried out at 160° C., on a Rheometric Scientific CT 5 (Rm 265) apparatus (Mettler Toledo). A 30 mm spindle was used. The applied shear-rate was 70 $s^{-1}$. The acid and hydroxyl values of the resins were determined titrimetrically according to ISO 2114-2000 and ISO 4629-1978, respectively.

The weight per unsaturation (WPU) was determined via $^1$H-NMR on a 300 MHz Varian NMR-spectrometer using pyrazine as internal standard. Recorded spectra were analyzed in full with ACD software and peak areas of all peaks were calculated.

The weight resin per mole unsaturation was calculated with the following formula:

$$WPU = \left[\frac{W_{pyr}}{W_{resin}} \frac{1}{MW_{pyr}} \frac{A_{c=c}/N_{c=c}}{A_{pyr}/N_{pyr}}\right]^{-1}$$

$W_{pyr}$ and $W_{resin}$ are weights pyrazine (is internal standard) and resin, respectively, expressed in the same units. $MW_{pyr}$ is molecular weight pyrazine (=80 gr/mole). $A_{c=c}$ is the peak area for hydrogens attached to the carbon carbon double bonds of the reactive unsaturations (C=C component) in the resin; $N_{c=c}$ is the number of hydrogens of that particular C=C component. $A_{pyr}$ is the peak area for pyrazine and $N_{pyr}$ is the number of hydrogens (=4).

Powder Coating Composition Analysis

Thermal analysis measurement of the initial and stored (2 months at 25° C. or 72 hours at 40° C.) powder coating composition were carried out via differential scanning calorimetry (DSC) on a DSC Q2000 apparatus from TA Instruments in $N_2$ atmosphere. A powder coating composition sample of approximately 5-10 mg was used. The sample was first stabilized at 0° C. (2 minutes), then heated with 5° C./min to 200° C. With the accompanied analysis software from TA Instruments, the onset temperature and the peak temperature of the DSC trace were calculated.

TABLE 3

Synthesis and properties of the resins used

| Monomers | Resin no. A Amount (mole %) |
|---|---|
| Neopentylglycol | 47.9 |
| Trimethylol propane | 3.7 |
| Terephthalic acid | 37.5 |
| Fumaric acid | 10.9 |
| Ethylene carbonate | X |
| Resin characterization | |
| Weight per unsaturation (WPU) (theoretical) | 1028 |
| Weight per unsaturation (WPU) (measured with NMR) | 1130 |
| Mn (theoretical) | 2723 |
| Hydroxyl value (mg KOH/g) | 42.7 |
| Acid value (mg KOH/g) | 3.1 |
| Tg (° C.) | 46.5 |
| Viscosity at 160° C. (Pa · s) | 21.2 |

Synthesis of Vinyl Ether Based Co Crosslinkers: General Procedure

Method to Determine Presence of Free-NCO.

An FT-IR spectra was recorded on a Varian Excalibur apparatus equipped with an ATR (Golden Gate) accessories. A characteristic peak for free NCO can be found at 2250 $cm^{-1}$. Presence of a peak at this position refers to free NCO groups.

Co-Crosslinker Synthesis (I)

A reaction vessel fitted with a thermometer, a stirrer and a distillation device, was filled with a tin catalyst and the monomers for the first step (all the (poly)alcohols, isophthalic acid) as listed in table 4. Stirring was then applied and a light nitrogen flow was passed over the reaction mixture while the temperature was raised to 220° C. Subsequently, for the second step a vinylether as listed in table 3 and a tin catalyst were added at a temperature of 120° C. Subsequently, an isocyanate as listed in table 3 was dosed such that the reaction mixture was kept below 120° C. during addition. After all isocyanate was dosed, the temperature was kept or set at 120° C. and maintained at this temperature for approximately half an hour. Next, n-butanol was added until all free NCO had reacted (measured using FT-IR as described above). The temperature was kept at 120° C. and vacuum (0.1 bar) was applied to remove all volatiles. After vacuum the content of the vessel was discharged.

TABLE 4

Synthesis and properties of the co-crosslinker

|  | Co-crosslinker I |
|---|---|
|  | Type |
|  | Urethane vinylether |
|  | Amount (mole %) |
| Hydroxyl butyl vinyl ether | 28.5 |
| Isophorone diisocyanate | 28.5 |
| Hydrogenated bisphenol A | 14.3 |
| Neopentylglycol | 14.3 |
| Isophthalic acid | 14.3 |
| Co-crosslinker characterization |  |
| Mn (theoretical) | 1152 |
| Weight per unsaturation in g/mole (WPU) (theoretical) | 576 |
| Weight per unsaturation in g/mole (WPU) (determined using $^1$H NMR) | 623 |
| Tg (° C.) | 41 |
| Hydroxyl value (mg KOH/g) | 1.0 |
| Acid value (mg KOH/g) | 0.5 |
| Viscosity at 160° C. (Pa · s) | 3.9 |

Preparation of the Powder Coating Composition, Application and Analysis:

The compositions of the tested powder coating composition are given in the tables below. The components were extruded at 60° C. using a Prism Twin Screw extruder (200 rpm, torque >90%). The extrudate was grinded and sieved; the sieving fractions smaller than 90 microns were used as a powder coating composition. The powder coating compositions were applied with a corona powder application spray gun on an aluminum ALQ panel and cured at various temperatures for 15 minutes in a convection oven (Heraeus Utah 6120). The applied coating layer thickness was approximately 60 μm.

Preparation of the Powder Coating Composition

The ratio resin:co-crosslinker is chosen 3:2 on mole unsaturation. The amount of initiator in the thermal initiation system is based on the total weight of the resin system (e.g. x mole initiator per kg resin system). The amount of inhibitor in the initiation system is based on the total weight of the resin system. The amount of accelerator in the initiation system is based on the total weight of the resin system (e.g. x mole accelerator per kg resin system). The amount of flow agent is calculated in wt % of the total powder coating composition. In all powder coating composition 0.8 wt % flow agent was used, unless described differently.

Flow of the Powder Coating Composition

Flow characteristics (flow) of the powder coating compositions on the substrate can be determined by comparing the flow of the coating with PCI Powder Coating Flow panels (ACT Test Panels Inc.) at a coating thickness of approximately 60 μm. The rating of flow is from 1 to 10, with 1 representing the roughest coating and 10 representing the coating with the best flow.

Example 1 and Comparative Experiment A

TABLE 5

Flow and stability of powder coating composition after storing for 2 months at 25° C.

|  | Exp-# | | |
|---|---|---|---|
|  | comparative example A.1 | 1.1 | 1.2 |
| Resin | A | A | A |
| Co-crosslinker | I | I | I |
| Initiation system |  |  |  |
| Initiator | Trigonox ™ C 92.0 mmol/kg | Luperox ™ A75 92.0 mmol/kg | Laurox ™ S 92.0 mmol/kg |
| Chemical name | Tert-butyl peroxybenzoate | Dibenzoyl peroxide | Dilauroyl peroxide |
| Inhibitor | Tert-butyl hydroquinone 500 ppm | Tert-butyl hydroquinone 500 ppm | Tert-butyl hydroquinone 500 ppm |
| Accelerator | Co 3.0 mmol/kg | Co 3.0 mmol/kg | Co 3.0 mmol/kg |
| Extrusion | Ok | Ok | Ok |
| Flow (PCI scale) | 2 | 2 | 1 |
| Flow After 2 months | 0 | 2 | 1 |
| Initial onset temperature (° C.) | 107.7 | 111.6 | 100.2 |
| Initial peak temperature (° C.) | 111.8 | 122.1 | 106.5 |
| Onset temperature after 2 months at 25° C. (° C.) | 92.9 | 116.8 | 101.7 |
| Peak temperature after 2 months at 25° C. (° C.) | 98.3 | 125.8 | 108.4 |

The examples 1.1 and 1.2 and the comparative example A.1 clearly demonstrate the beneficial use of the peroxides according to the invention with respect to their chemical storage stability as can be seen from the decrease in flow after storage of the powder coating composition.

Furthermore these experiments indicate that the DSC can be used to easily assess the storage stability and the flow. In case the onset/peak temperature of curing remains the same or increases the flow remains the same, whereas in case the onset/peak temperature decreases also the flow decreases.

In order to assess the effect on the flow characteristics using minimal amounts of powder coating formulations, this DSC methodology was employed on the samples stored at 40° C. as depicted in table 6 and 7.

Example 2

TABLE 6

Stability of powder coating composition after 72 hours at 40° C.

|  | Exp-# | | |
|---|---|---|---|
|  | comparative example A.2 | 2.1 | 2.2 |
| Resin | A | A | A |
| Co-crosslinker | I | I | I |
| Initiation system |  |  |  |
| Initiator | Trigonox ™ C 92.0 mmol/kg | Luperox ™ A75 92.0 mmol/kg | Laurox ™ S 92.0 mmol/kg |
| Chemical name | Tert-butyl peroxybenzoate | Dibenzoyl peroxide | Dilauroyl peroxide |
| Inhibitor | Tert-butyl hydroquinone 500 ppm | Tert-butyl hydroquinone 500 ppm | Tert-butyl hydroquinone 500 ppm |

TABLE 6-continued

Stability of powder coating composition after 72 hours at 40° C.

| | Exp-# | | |
|---|---|---|---|
| | comparative example A.2 | 2.1 | 2.2 |
| Accelerator | Co 3.0 mmol/kg | Co 3.0 mmol/kg | Co 3.0 mmol/kg |
| Extrusion | Ok | Ok | Ok |
| Initial onset temperature (° C.) | 107.7 | 111.6 | 100.2 |
| Initial peak temperature (° C.) | 111.8 | 122.1 | 106.5 |
| Onset temperature after 72 hours at 40° C. (° C.) | 91.2 | 114.2 | 101.5 |
| Peak temperature after 72 hours at 40° C. (° C.) | 97.3 | 123.8 | 108.9 |

As can clearly be observed from the data in table 6 upon storage at 40° C. the flow employing the peroxides according to the invention remains good as indicated by the DSC data whereas at 40° C. an even further deterioration of the flow characteristics is observed. Compare to this end the examples 2.1 and 2.2 (DSC onset/peak temperature remains the same or increases) with comparative experiment A2 (DSC onset/peak temperature decreases).

Example 3

TABLE 7

Stability of powder coating compositions comprising Luperox A 75 after 72 hours at 40° C.

| | Exp-# | | | |
|---|---|---|---|---|
| | 3.1 | 3.2 | 3.3 | 3.4 |
| Resin | A | A | A | A |
| Co-crosslinker | I | I | I | I |
| Initiation system | | | | |
| Initiator | Luperox ™ A75 92.0 mmol/kg | Luperox ™ A75 92.0 mmol/kg | Luperox ™ A75 92.0 mmol/kg | Luperox ™ A75 92.0 mmol/kg |
| Chemical name | Dibenzoyl peroxide | Dibenzoyl peroxide | Dibenzoyl peroxide | Dibenzoyl peroxide |
| Inhibitor | Tert-butyl hydroquinone 500 ppm | — | Tert-butyl hydroquinone 500 ppm | — |
| Accelerator | Co 3.0 mmol/kg | Co 3.0 mmol/kg | — | — |
| Extrusion | Ok | Ok | Ok | Ok |
| Initial onset temperature (° C.) | 111.6 | 906.0 | 111.0 | 96.3 |
| Initial peak temperature (° C.) | 122.1 | 122.5 | 121.4 | 121.3 |
| Onset temperature after 72 hours at 40° C. (° C.) | 114.2 | 98.3 | 113.8 | 98.5 |
| Peak temperature after 72 hours at 40° C. (° C.) | 123.8 | 124.0 | 123.1 | 122.0 |

These examples clearly show that the presence of a transition metal catalyst (the accelerator) does not influence the flow characteristics upon curing (example 3.4 vs 3.2 where the peak/onset temperatures remain the same). Furthermore, these examples demonstrate the positive effect on the flow characteristics when employing a hydroquinone type inhibitor (3.1 vs 3.2 and 3.3 vs 3.4 as the higher peak/onset temperatures indicate a better flow).

The invention claimed is:

1. A one component heat curable powder coating composition comprising:
   (i) a polyester resin containing reactive unsaturations, the polyester resin having a weight per the reactive unsaturations (WPU) as determined using $^1$H-NMR which is higher than 250 and lower than 1500 g/mole,
   (ii) a thermal initiation system comprising a peroxide chosen from the group consisting of compounds represented by formula (1)

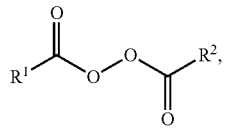

(1)

wherein
   $R^1$ and $R^2$ each independently stand for an optionally substituted alkyl of 1 to 30 C-atoms, wherein the 1 to 30 C-atoms do not include the C-atoms of the substituents or for an optionally substituted aryl of 6 to 18 C-atoms, and wherein the 6 to 18 C-atoms do not include the C-atoms of the substituents, and
   (iii) a co-crosslinker having a weight per unsaturation (WPU) as determined using $^1$H-NMR higher than 150 and lower than 870 g/mole, said crosslinker being chosen from the group consisting of vinylethers, vinyletherurethanes, vinylesters, vinylamides, itaconates, enamines, vinylureas and mixtures thereof, wherein
all of the reactive unsaturations are carbon-carbon double bonds connected directly to an electron withdrawing group and are reactive towards radicals generated by the peroxide, and wherein the thermal initiation system is present in an amount such that when the powder coating composition is applied to a substrate and cured at a temperature of 130° C. for 20 minutes, the resulting coating resists at least 50 acetone double rubs (ADR), wherein each ADR is a back and forward movement over a surface of the coating having a thickness of approximately 60 μm using a cotton cloth drenched in acetone covering a hammer head having a weight of 980 grams and a contact surface area with the coating of 2 cm$^2$.

2. The composition according to claim 1, wherein the resin has a WPU higher than 250 and less than 1150 g/mole.

3. The composition according to claim 1, wherein the resin has a WPU higher than 500 and less than 1500 g/mole.

4. The composition according to claim 1, wherein the resin has a WPU higher than 500 and less than 1150 g/mole.

5. The composition according to claim 1, wherein the co-crosslinker has a WPU higher than 150 and lower than 650 g/mole.

6. The composition according to claim 1, wherein the co-crosslinker has a WPU higher than 150 and lower than 630 g/mole.

7. The composition according to claim 1, wherein the resin has a hydroxyl value in the range of from 0 to 70 mg KOH per g resin.

8. The composition according to claim 1, wherein the reactive unsaturations of the resin are based on maleic acid, fumaric acid, itaconic acid, acrylic acid and/or methacrylic acid.

9. The composition according to claim 1, wherein the reactive unsaturations of the resin are based on maleic acid, fumaric acid, citraconic acid, itaconic acid, and/or mesaconic acid.

10. The composition according to claim 1, wherein the reactive unsaturations of the resin are based on fumaric acid and/or maleic acid.

11. The composition according to claim 1, wherein the reactive unsaturations of the resin are based on fumaric acid.

12. The composition according to claim 1, wherein the peroxide is benzoyl peroxide or lauroyl peroxide.

13. The composition according to claim 1, wherein the co-crosslinker is chosen from the group of vinylethers, vinylesters and mixtures thereof.

14. The composition according to claim 13, wherein the co-crosslinker is a vinylether.

15. The composition according to claim 13, wherein the resin has an acid value of less than 10 mg KOH per g resin.

16. The composition according to claim 14, wherein the resin has an acid value of less than 10 mg KOH per g resin.

17. The composition according to claim 13, wherein the resin has an acid value of less than 5 mg KOH per g resin.

18. The composition according to claim 14, wherein the resin has an acid value of less than 5 mg KOH per g resin.

19. The composition according to claim 1, wherein the composition further comprises an inhibitor.

20. The composition according to claim 19, wherein the inhibitor is a hydroquinone or a catechol.

21. The composition according to claim 1, wherein the resin has a glass transition temperature of at least 40° C. as measured via DSC at a heating rate of 5° C./min.

22. The composition according to claim 1, wherein the resin has a glass transition temperature of at least 45° C. as measured via DSC at a heating rate of 5° C./min.

23. The composition according to claim 1, wherein the resin has a glass transition temperature of at least 40 and of at most 65° C. as measured via DSC at a heating rate of 5° C./min.

24. The composition according to claim 1, wherein the resin has a number average molecular weight in the range of from 1500 to 8000 Da.

25. The composition according to claim 1, wherein the resin has a number average molecular weight in the range of from 2100 to 4000 Da.

26. The composition according to claim 1, wherein
the reactive unsaturations of the resin are based on maleic acid, fumaric acid, itaconic acid, acrylic acid and/or methacrylic acid, said resin has a hydroxyl value in the range of from 0 to 70 mg KOH per g resin and a number average molecular weight in the range of from 1500 to 8000 Da and a glass transition temperature of at least 40° C. as measured via DSC at a heating rate of 5° C./min; and
the co-crosslinker has a WPU higher than 150 and lower than 630 g/mole and said co-crosslinker is chosen from the group of vinylethers, vinylesters and mixtures thereof.

27. The composition according to claim 1, wherein
the reactive unsaturations of the resin are based on maleic acid, fumaric acid, itaconic acid, acrylic acid and/or methacrylic acid, said resin has a hydroxyl value in the range of from 0 to 70 mg KOH per g resin and an acid value of less than 10 mg KOH per g resin, and a number average molecular weight in the range of from 1500 to 8000 Da and a glass transition temperature of at least 40° C. as measured via DSC at a heating rate of 5° C./min; and
the co-crosslinker has a WPU higher than 150 and lower than 630 g/mole and said co-crosslinker is a vinylether; and
the composition comprises an inhibitor.

28. The composition according to claim 27, wherein the reactive unsaturations of the resin are based on fumaric acid and/or maleic acid.

29. The composition according to claim 28, wherein the reactive unsaturations of the resin are based on fumaric acid and/or maleic acid.

30. The composition according to claim 1, wherein
the reactive unsaturations of the resin are based on maleic acid, fumaric acid, itaconic acid, acrylic acid and/or methacrylic acid, said resin has a hydroxyl value in the range of from 0 to 70 mg KOH per g resin and a number average molecular weight in the range of from 1500 to 8000 Da and a glass transition temperature of at least 40° C. as measured via DSC at a heating rate of 5° C./min; and
the co-crosslinker has a WPU higher than 150 and lower than 630 g/mole and said co-crosslinker is chosen from the group of vinylethers, vinylesters and mixtures thereof; and
the composition comprises an inhibitor.

31. The composition according to claim 30, wherein the reactive unsaturations of the resin are based on fumaric acid and/or maleic acid.

32. The composition according to claim 1, wherein
the reactive unsaturations of the resin are based on maleic acid, fumaric acid, itaconic acid, acrylic acid and/or methacrylic acid, said resin has a hydroxyl value in the range of from 0 to 70 mg KOH per g resin and a number average molecular weight in the range of from 1500 to 8000 Da and a glass transition temperature of at least 40° C. as measured via DSC at a heating rate of 5° C./min; and the co-crosslinker has a WPU higher than 150 and lower than 630 g/mole and said co-crosslinker is a vinylether; and the composition comprises an inhibitor.

33. The composition according to claim 32, wherein the reactive unsaturations of the resin are based on fumaric acid and/or maleic acid.

34. The composition according to claim 1, wherein the reactive unsaturations of the resin are based on maleic acid, fumaric acid, itaconic acid, acrylic acid and/or methacrylic acid, said resin has a hydroxyl value in the range of from 0 to 70 mg KOH per g resin and an acid value of less than 10 mg KOH per g resin, and a number average molecular weight in the range of from 1500 to 8000 Da and a glass transition temperature of at least 40° C. as measured via DSC at a heating rate of 5° C./min; and the co-crosslinker has a WPU higher than 150 and lower than 630 g/mole and said co-crosslinker is a vinylether.

35. The composition according to claim 34, wherein the reactive unsaturations of the resin are based on fumaric acid and/or maleic acid.

36. The composition according to claim 1, wherein the reactive unsaturations of the resin are based on maleic acid, fumaric acid, itaconic acid, acrylic acid and/or methacrylic acid, said resin has a hydroxyl value in the range of from 0 to 70 mg KOH per g resin and an acid value of less than 5 mg KOH per g resin, and a number average molecular weight in the range of from 1500 to 8000 Da and a glass transition temperature of at least 40° C. as measured via DSC at a heating rate of 5° C./min; and the co-crosslinker has a WPU higher than 150 and lower than 630 g/mole and said co-crosslinker is a vinylether.

37. The composition according to claim 36, wherein the reactive unsaturations of the resin are based on fumaric acid and/or maleic acid.

38. The composition according to claim 1, wherein the reactive unsaturations of the resin are based on maleic acid, fumaric acid, itaconic acid, acrylic acid and/or methacrylic acid, said resin has a hydroxyl value in the range of from 0 to 70 mg KOH per g resin and a number average molecular weight in the range of from 1500 to 8000 Da and a glass transition temperature of at least 40° C. as measured via DSC at a heating rate of 5° C./min; and the co-crosslinker has a WPU higher than 150 and lower than 630 g/mole and said co-crosslinker is a vinylether.

39. The composition according to claim 38, wherein the reactive unsaturations of the resin are based on fumaric acid and/or maleic acid.

40. The composition according to claim 1, wherein the reactive unsaturations of the resin are based on maleic acid, fumaric acid, itaconic acid, acrylic acid and/or methacrylic acid, said resin has a hydroxyl value in the range of from 0 to 70 mg KOH per g resin and an acid value of less than 5 mg KOH per g resin, and a number average molecular weight in the range of from 1500 to 8000 Da and a glass transition temperature of at least 40° C. as measured via DSC at a heating rate of 5° C./min; and the co-crosslinker has a WPU higher than 150 and lower than 630 g/mole and said co-crosslinker is a vinylether; and the composition comprises an inhibitor.

41. The composition according to claim 40, wherein the reactive unsaturations of the resin are based on fumaric acid and/or maleic acid.

42. A process for the preparation of a powder coating composition according to claim 1 comprising the steps of:
 (a) mixing the components of the powder coating composition to obtain a premix;
 (b) heating the premix to obtain an extrudate;
 (c) cooling down the extrudate to obtain a solidified extrudate; and
 (d) breaking the solidified extrudate into smaller particles to obtain the powder coating composition.

43. A process for coating a substrate comprising the following steps:
 (1) applying a powder coating composition according to claim 1 to a substrate; and
 (2) heating the substrate.

44. A substrate that is fully or partially coated with a powder coating composition according to claim 1.

45. The substrate according to claim 44, wherein the substrate is a heat-sensitive substrate selected from the group consisting of wood and plastic.

* * * * *